(12) United States Patent  
Hosseini et al.

(10) Patent No.: US 11,324,015 B2  
(45) Date of Patent: May 3, 2022

(54) CHANNEL REPORTING FOR COMMUNICATION SERVICE PRIORITY TYPES

(71) Applicant: QUALCOMM Incorporated, San Diego, CA (US)

(72) Inventors: Seyedkianoush Hosseini, San Diego, CA (US); Amir Farajidana, Sunnyvale, CA (US); Achaleshwar Sahai, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 16/195,560

(22) Filed: Nov. 19, 2018

(65) Prior Publication Data

US 2019/0159219 A1     May 23, 2019

Related U.S. Application Data

(60) Provisional application No. 62/590,261, filed on Nov. 22, 2017.

(51) Int. Cl.
    *H04W 72/10*         (2009.01)
    *H04B 7/06*          (2006.01)
    (Continued)

(52) U.S. Cl.
    CPC .......... *H04W 72/10* (2013.01); *H04B 7/0626* (2013.01); *H04B 7/0628* (2013.01);
    (Continued)

(58) Field of Classification Search
    CPC .................................................. H04W 72/10
    See application file for complete search history.

(56) References Cited

U.S. PATENT DOCUMENTS

2008/0232433 A1*    9/2008    McNew ................ H04W 28/18
                                                             375/140
2013/0258965 A1*   10/2013    Geirhofer ........... H04W 72/048
                                                             370/329

(Continued)

FOREIGN PATENT DOCUMENTS

EP              2466947 A1     6/2012
EP              3016459 A1     5/2016
(Continued)

OTHER PUBLICATIONS

International Search Report and Written Opinion—PCT/US2018/061973—ISA/EPO—dated Mar. 8, 2019.

(Continued)

*Primary Examiner* — John D Blanton
(74) *Attorney, Agent, or Firm* — Holland & Hart LLP

(57) ABSTRACT

Methods, systems, and devices for prioritization of channel state information (CSI) processes based on a set of priority rules and a device capability are described. A user equipment (UE) may be capable of supporting multiple communication types such as ultra-reliable low latency communications (URLLC), shortened transmission time interval (sTTI), enhanced mobile broadband (eMBB) priority type, etc. The UE may indicate a CSI update capability that includes a number of CSI processes capable of being updated by the UE. The CSI update capability may be a joint CSI update capability provided for all communication types. Based on the CSI update capability of the UE and the set of priority rules, the UE may prioritize the updating of one or more CSI processes.

48 Claims, 9 Drawing Sheets

(51) Int. Cl.
*H04L 1/00* (2006.01)
*H04W 88/02* (2009.01)
*H04B 7/08* (2006.01)
*H04W 72/12* (2009.01)

(52) U.S. Cl.
CPC ............ *H04L 1/0026* (2013.01); *H04B 7/088* (2013.01); *H04L 1/0027* (2013.01); *H04W 72/1226* (2013.01); *H04W 72/1242* (2013.01); *H04W 88/02* (2013.01)

(56) References Cited

U.S. PATENT DOCUMENTS

| | | | |
|---|---|---|---|
| 2015/0365219 A1* | 12/2015 | Liu | H04W 24/10 370/329 |
| 2016/0105882 A1* | 4/2016 | Park | H04L 5/0053 370/329 |
| 2017/0048740 A1* | 2/2017 | Yang | H04W 72/10 |
| 2017/0230939 A1* | 8/2017 | Rudolf | H04L 67/104 |
| 2018/0279293 A1 | 9/2018 | Harrison et al. | |
| 2018/0324791 A1* | 11/2018 | Nogami | H04W 72/0446 |
| 2018/0324797 A1 | 11/2018 | Hosseini et al. | |
| 2019/0075582 A1* | 3/2019 | Kim | H04L 1/0029 |
| 2019/0159138 A1* | 5/2019 | Lee | H04W 52/146 |
| 2019/0268938 A1* | 8/2019 | Zhao | H04L 5/0048 |
| 2019/0342839 A1* | 11/2019 | Shao | H04W 52/346 |
| 2020/0177255 A1* | 6/2020 | Lee | H04W 8/24 |

FOREIGN PATENT DOCUMENTS

| | | |
|---|---|---|
| EP | 3240202 A1 | 11/2017 |
| WO | WO-2018231002 A1 | 12/2018 |

OTHER PUBLICATIONS

LG Electronics: "Discussions on CSI Reporting", 3GPP Draft; R1-1717940_CSI Reporting_V3, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 8, 2017 (Oct. 8, 2017), 8 Pages, XP051341124, Retrieved from the Internet: URL: http://www.3gpp.org/ftp/Meetings_3GPP_SYNC/RAN1/Docs/ [retrieved on Oct. 8, 2017].

LG Electronics: "Potential Techniques for URLLC in LTE", 3GPP Draft; R1-1719891 Techniques for LTE URLLC V1,3rd Generation Partnership Project (3GPP), Mobile Competence Centre; 650, Route Des Lucioles; F-06921 Sophia-Antipolis Cedex; France, vol. RAN WG1, No. Reno, US; Nov. 27, 2017-Dec. 1, 2017, Nov. 18, 2017 (Nov. 18, 2017), 7 Pages, XP051369604, Retrieved from the Internet: URL: http://www.3gpp.org/ftp/tsg%5Fran/WG1%5FRL1/TSGR1%5F91/Docs/ [retrieved on Nov. 18, 2017].

* cited by examiner

CHANNEL REPORTING FOR COMMUNICATION SERVICE PRIORITY TYPES

CROSS REFERENCES

The present application for patent claims the benefit of U.S. Provisional Patent Application No. 62/590,261 by Hosseini et al., entitled "CHANNEL REPORTING FOR COMMUNICATION SERVICE PRIORITY TYPES," filed Nov. 22, 2017, assigned to the assignee hereof, and expressly incorporated by reference herein.

BACKGROUND

The following relates generally to wireless communications, and more specifically to channel reporting for communication service priority types.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may be configured to support multiple types of communications with different priority levels (e.g., ultra-reliable low latency communications (URLLC), enhanced mobile broadband (eMBB) communications, shortened transmission time interval (sTTI) communications). Accordingly, a base station may request channel state information (CSI) reports from the UE for one or more carriers of the different priority level types of communications, where the UE may update CSI processes corresponding to the requested CSI reports before responding with updated CSI reports for one or more carriers of the types of communications. In order to prevent an overload at the UE due to updating a large number of CSI processes in succession, the UE may employ limits to the number of CSI updates performed.

SUMMARY

The described techniques relate to improved methods, systems, devices, or apparatuses that support channel reporting for communication service priority types. Generally, the described techniques provide for prioritization of channel state information (CSI) processes to be updated by a user equipment (UE) based on a set of priority rules. The set of priority rules may be identified by the UE (e.g., the set of priority rules may be predetermined according to a set of standards, preconfigured at the UE, or determined dynamically by the UE depending on UE capabilities). A UE may be capable of supporting multiple service priority types such as an ultra-reliable low latency communications (URLLC) priority type, a shortened transmission time interval (sTTI) priority type, an enhanced mobile broadband (eMBB) priority type, etc. A UE may indicate or report (e.g., transmit to a base station or other network node) a CSI update capability of the UE. The CSI update capability may include or indicate a number of CSI processes capable of being updated by the UE (e.g., a maximum number), which may for a primary cell (e.g., a serving cell), a secondary cell, or a set of one or more component carriers (CCs). The CSI update capability may be a joint CSI update capability in that it is provided for all service priority types.

Based on the CSI update capability of the UE and the set of priority rules, the UE may prioritize the updating of one or more CSI processes. In some examples, the one or more processes may be triggered by an update request (e.g., received at the UE from a base station) and may be associated with multiple service types. A portion of or all of the one or more CSI processes may be updated based on the prioritization and the CSI update capability and the updated CSI may be reported (e.g., transmitted by the UE to a base station). In some cases, at least one CSI process may not be updated as a result of the CSI update capability (e.g., in a case where a UE is only capable of updating a maximum number of CSI processes) and in such instances, CSI may be reported for the at least one CSI process using stale information such as a previously determined CSI for the at least one CSI process.

A method of wireless communications is described. The method may include identifying that a UE supports communications of a first service priority type and a second service priority type, reporting a CSI update capability associated with both the first and second service priority types, prioritizing one or more CSI processes of the first service priority type, the second service priority type, or both based on a set of priority rules and the CSI update capability, updating CSI for the one or more CSI processes based on the prioritization of the one or more CSI processes, and reporting the updated CSI.

An apparatus for wireless communications is described. The apparatus may include means for identifying that a UE supports communications of a first service priority type and a second service priority type, means for reporting a CSI update capability associated with both the first and second service priority types, means for prioritizing one or more CSI processes of the first service priority type, the second service priority type, or both based on a set of priority rules and the CSI update capability, means for updating CSI for the one or more CSI processes based on the prioritization of the one or more CSI processes, and means for reporting the updated CSI.

Another apparatus for wireless communications is described. The apparatus may include a processor, memory in electronic communication with the processor, and instructions stored in the memory. The instructions may be operable to cause the processor to identify that a UE supports communications of a first service priority type and a second service priority type, report a CSI update capability associated with both the first and second service priority types, prioritize one or more CSI processes of the first service priority type, the second service priority type, or both based on a set of priority rules and the CSI update capability, update CSI for the one or more CSI processes based on the prioritization of the one or more CSI processes, and report the updated CSI.

A non-transitory computer-readable medium for wireless communications is described. The non-transitory computer-readable medium may include instructions operable to cause a processor to identify that a UE supports communications of a first service priority type and a second service priority type, report a CSI update capability associated with both the first and second service priority types, prioritize one or more CSI processes of the first service priority type, the second service priority type, or both based on a set of priority rules and the CSI update capability, update CSI for the one or more CSI processes based on the prioritization of the one or more CSI processes, and report the updated CSI.

In some examples of the method, apparatus, and non-transitory computer-readable medium described above, reporting the updated CSI includes reporting the updated CSI and a previously determined CSI of at least one of the one or more CSI processes based at least in part on a service priority type of the at least one of the one or more CSI processes.

In some examples of the method, apparatus, and non-transitory computer-readable medium described above, reporting the updated CSI includes refraining from reporting a previously determined CSI of at least one of the one or more CSI processes based at least in part on a service priority type of the at least one of the one or more CSI processes.

In some examples of the method, apparatus, and non-transitory computer-readable medium described above, prioritizing the one or more CSI processes includes: prioritizing a CSI process associated with a URLLC priority service type over a CSI process associated with an sTTI priority service type in accordance with the set of priority rules.

In some examples of the method, apparatus, and non-transitory computer-readable medium described above, prioritizing the one or more CSI processes includes: prioritizing a CSI process associated with a later received CSI request and a higher priority service type over a CSI process associated with an earlier received CSI request and a lower priority service type.

In some examples of the method, apparatus, and non-transitory computer-readable medium described above, prioritizing the one or more CSI processes includes: prioritizing a CSI process associated with a URLLC priority service type over a CSI process associated with an eMBB priority service type in accordance with the set of priority rules.

In some examples of the method, apparatus, and non-transitory computer-readable medium described above, prioritizing the one or more CSI processes includes: prioritizing a CSI process associated with an aperiodic CSI request over a CSI process associated with a periodic CSI request in accordance with the set of priority rules.

In some examples of the method, apparatus, and non-transitory computer-readable medium described above, prioritizing the one or more CSI processes includes: prioritizing a CSI process associated with a lower cell index over a CSI process associated with a higher cell index in accordance with the set of priority rules.

In some examples of the method, apparatus, and non-transitory computer-readable medium described above, prioritizing the one or more CSI processes includes: prioritizing a CSI process associated with a lower CSI process index over a CSI process associated with a higher CSI process index in accordance with the set of priority rules.

In some examples of the method, apparatus, and non-transitory computer-readable medium described above, prioritizing the one or more CSI processes includes: prioritizing a CSI process associated with a first downlink control information (DCI) format different from the first DCI format over a CSI process associated with a second DCI format in accordance with the set of priority rules.

In some examples of the method, apparatus, and non-transitory computer-readable medium described above, prioritizing the one or more CSI processes includes: prioritizing a CSI process associated with a first block error rate (BLER) target value over a CSI process associated with a second BLER target value different from the first BLER target value in accordance with the set of priority rules.

In some examples of the method, apparatus, and non-transitory computer-readable medium described above, updating CSI for the one or more CSI processes includes: updating fewer than all of the one or more CSI processes based on the prioritization of the one or more CSI processes and the CSI update capability.

In some examples of the method, apparatus, and non-transitory computer-readable medium described above, reporting the CSI update capability includes reporting a pair of CSI update capabilities, each corresponding to a respective one of the first service priority type and the second service priority type.

In some examples of the method, apparatus, and non-transitory computer-readable medium described above, reporting the updated CSI includes: reporting a previously determined CSI of at least one of the one or more CSI processes based on the CSI update capability.

Some examples of the method, apparatus, and non-transitory computer-readable medium described above may further include processes, features, means, or instructions for receiving a first CSI request associated with the first service priority type, where a first CSI process of the one or more CSI processes may be updated in response to the first CSI request.

Some examples of the method, apparatus, and non-transitory computer-readable medium described above may further include processes, features, means, or instructions for receiving a second CSI request associated with the second service priority type, where a second CSI process of the one or more CSI processes may be updated in response to the second CSI request.

In some examples of the method, apparatus, and non-transitory computer-readable medium described above, updating CSI for the one or more CSI processes includes: performing a CSI update for the first CSI process before performing a CSI update for the second CSI process based on the set of priority rules.

Some examples of the method, apparatus, and non-transitory computer-readable medium described above may further include processes, features, means, or instructions for receiving a third CSI request associated with the first service priority type, where updating the CSI for the one or more CSI processes includes canceling a CSI update for the second CSI process and performing a CSI update for a third CSI process based on the set of priority rules and the CSI update capability.

In some examples of the method, apparatus, and non-transitory computer-readable medium described above, reporting the updated CSI includes: transmitting a CSI feedback message via a physical uplink shared channel (PUSCH) or a physical uplink control channel (PUCCH).

In some examples of the method, apparatus, and non-transitory computer-readable medium described above, reporting the updated CSI includes: reporting respective CSI feedback messages for each of a plurality of CCs.

In some examples of the method, apparatus, and non-transitory computer-readable medium described above, the updated CSI may be reported based on respective transmission modes associated with the one or more CSI processes.

In some examples of the method, apparatus, and non-transitory computer-readable medium described above, the first service priority type includes a URLLC priority service, an sTTI priority service, or an eMBB priority service and the second service priority type may be different than the first service priority type.

In some examples of the method, apparatus, and non-transitory computer-readable medium described above, the CSI update capability indicates a number of CSI update processes supported by the UE per serving cell.

In some examples of the method, apparatus, and non-transitory computer-readable medium described above, the CSI update capability indicates a number of CSI processes across multiple CCs capable of being updated by the UE.

In some examples of the method, apparatus, and non-transitory computer-readable medium described above, the one or more CSI processes correspond to respective CCs of a primary cell or a secondary cell.

In some examples of the method, apparatus, and non-transitory computer-readable medium described above, the CSI update capability includes a joint CSI update capability

DETAILED DESCRIPTION

Figure 1:
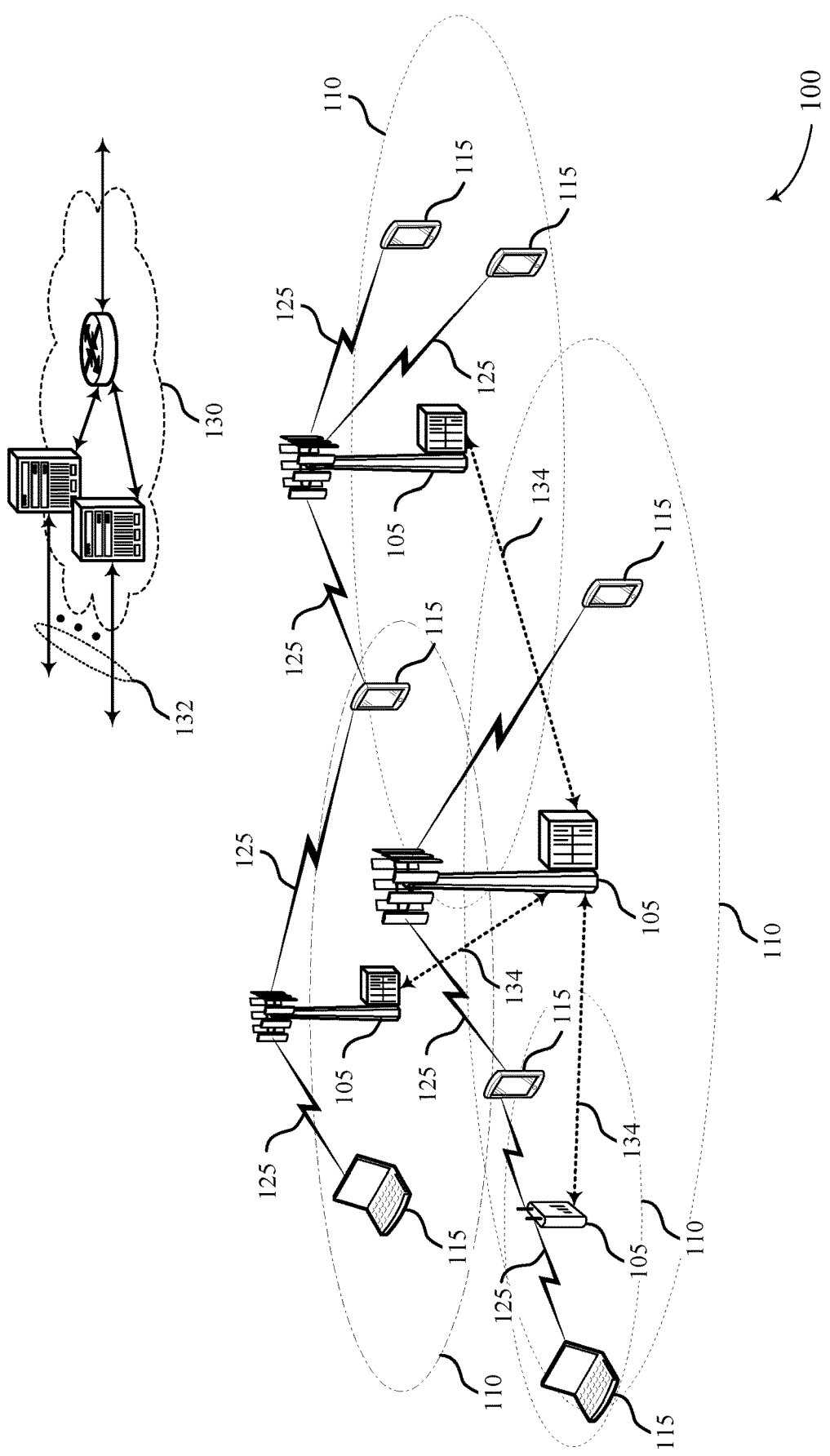
FIG. 1 illustrates an example of a wireless communications system that supports channel reporting for communication service priority types in accordance with aspects of the present disclosure.

In some wireless communications systems, a base station may aperiodically request a user equipment (UE) to transmit one or more channel state information (CSI) reports for corresponding component carriers (CCs). The UE may update a subset of CSI processes corresponding to the requested CSI reports before transmitting the CSI reports back to the base station. For example, the UE may update a number of CSI processes for a new aperiodic request according to a number of unreported CSI processes ($N_u$) associated with previously received CSI report requests for a single serving cell (e.g., a CC) and a maximum number of CSI processes supported by the UE and serving cell ($N_x$). Additionally or alternatively, the UE may update a number of CSI processes according to a maximum number of CSI processes ($N_y$), the UE may update when the UE is configured for communication via multiple cells (e.g., multiple CCs) and receives multiple aperiodic CSI report requests in a subframe. In some cases, the UE may be configured for regular transmission time intervals (TTIs) and for shortened TTIs (sTTIs). Accordingly, the UE may define separate $N_x$ and $N_y$ for both TTI and sTTI operations. Additionally, the UE may update CSI processes associated with sTTI CSI report requests according to $N_y$ and $N_u$, where $N_u$ may be defined as unreported CSI processes before an sTTI where signaling carrying the corresponding CSI process is transmitted. In some aspects, the number of unreported CSI processes before the sTTI carrying the corresponding CSI process (e.g., the sTTI carrying a physical uplink shared channel (PUSCH)) may include pending requests for TTI or sTTI operations (e.g., requests triggered by TTI (or legacy) DCI, sTTI DCI, or any combination thereof).

In some cases, a UE may be configured to support multiple types of communications with different priority levels (e.g., ultra-reliable low latency communications (URLLC), enhanced mobile broadband (eMBB) communications, sTTI communications, etc.). As such, the UE may choose to provide updated CSI processes separately for each of the different priority level types of communications because each type may have a separately configured transmission mode. For example, a first transmission mode (e.g., transmission mode 9 (TM9)) may be configured for a first priority level type of communication (e.g., sTTI communications), and a second transmission mode (e.g., transmission mode 2 (TM2)) may be configured for a second priority level type of communication (e.g., URLLC). The UE may be able to separately (e.g., separate CSI update capability) or jointly (e.g., joint CSI update capability) report its capability to update CSI processes for the different priority level types of communications. For example, the UE may define $N_x$ and $N_y$ for each type of communication (e.g., $N_{x\_sTTI}$, $N_{x\_URLLC}$, $N_{y\_sTTI}$, $N_{y\_URLLC}$), where the CSI process updates may be run separately for each type of communication. Alternatively, the UE may utilize a jointly defined $N_x$ and $N_y$ for the types of communications (e.g., $N_x$ and $N_y$ include both sTTI and URLLC CSI processes).

Whether the UE reports its CSI update capability jointly or separately, the UE may employ a set of priority rules for determining which CSI processes are updated for the different types of communications. For example, the UE may update CSI processes in time according to the type of communication associated with the CSI report request (e.g., URLLC CSI processes are updated before sTTI or eMBB CSI processes), when the CSI report request is received (e.g., earlier CSI report requests are updated before later CSI report requests), whether the CSI report request is aperiodic or periodic (e.g., aperiodic CSI report requests are updated before periodic CSI report requests), a cell index and/or CSI process index (e.g., lower indices are updated before larger indices), UE implementation, or a combination thereof. Additionally, the UE may employ a set of priority rules for updating CSI processes over the frequency-domain. For example, the UE may update CSI processes in frequency according to UE implementation, a block error rate (BLER) associated with the CSI process, a format or a value of the downlink control information (DCI) that contains the CSI report request, the type of communication associated with the CSI report request, a cell index and/or CSI process index, or a combination thereof.

Aspects of the disclosure are initially described in the context of wireless communications systems. Additionally, examples of CSI process timelines are provided to describe aspects of the disclosure. Aspects of the disclosure are further illustrated by and described with reference to a process flow, apparatus diagrams, system diagrams, and flowcharts that relate to channel reporting for communication service priority types.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCI), a virtual cell identifier (VCID)) operating via the same or a different carrier. In some examples, a carrier may support multiple cells, and different cells may be configured according to different protocol types (e.g., machine-type-communication (MTC), NB-IoT, eMBB, or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105.

Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at multiple antenna elements of an antenna array, or by processing received signals according to different receive beamforming weight sets applied to signals received at multiple antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of sTTIs or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, a base station 105 may aperiodically request a UE 115 to transmit multiple CSI reports for corresponding CCs. CSI may include information describing characteristics of the radio channel, typically indicating the complex transfer function matrix between one or more transmit antennas and one or more receive antennas. The base station 105 may gather channel condition information from the UE 115 in order to efficiently configure and schedule the channel. This information may be sent from the UE 115 in the form of a channel state report. The base station 105 may configure the UE 115 to send periodic reports at regular intervals and may also request additional reports as needed. Aperiodic reports may include wideband reports indicating the channel quality across an entire cell bandwidth, UE-selected reports indicating a subset of the best subbands, or configured reports in which the subbands reported are selected by the base station 105.

The UE 115 may update CSI processes corresponding to the requested CSI reports before transmitting the CSI reports to the base station 105. Alternatively, in order to prevent an overload at the UE 115 due to updating a large number of CSI processes in succession, the UE 115 may employ limits to the number of CSI updates performed in either or both of the time and frequency domain. For example, if the UE 115 is configured with more than one CSI process for a serving cell (e.g., a CC used for communication with base station 105), the UE 115, on reception of an aperiodic CSI report request triggering a CSI report (e.g., if the CSI report is triggered according to a table), may not be expected to update CSI processes corresponding to the CSI reference for all CSI processes. Rather, the UE may update the max(0, $N_x-N_u$) lowest-indexed CSI processes for the serving cell associated with the request. In such a case, $N_u$ may represent the number of unreported CSI processes of the UE 115 that are associated with other aperiodic CSI requests for the serving cell. A CSI process associated with a CSI request may be only counted as unreported in a subframe prior to one where a physical uplink shared channel (PUSCH) carrying the corresponding CSI report is transmitted. $N_x$ may represent the maximum number of CSI processes supported by the UE 115 for the serving cell.

In one example, a UE 115 may support four (4) CSI processes for a serving cell (i.e., $N_x$=4). In a first subframe, the UE 115 may receive a first trigger to report CSI for three (3) CSI processes for the serving cell. In the next subframe, the UE 115 may receive a second trigger to report three (3) CSI processes for the same serving cell. Upon receiving the second trigger, the first three (3) CSI processes associated with the first trigger may have not been reported (i.e., $N_u$=3). As such, the difference between the maximum number of supported CSI processes and the unreported CSI processes may be one (1) (i.e., max(0, $N_x-N_u$)=1). Therefore, the UE 115 may update one (1) CSI process with the lowest-indexed CSI process out of the three (3) CSI processes associated with the second trigger and transmit CSI that was initially or previously determined for the remaining CSI processes. As such, although CSI reports may be transmitted for all (6) CSI processes, only (4) of those CSI processes may be updated.

This approach may set a limit on the number of CSI processes that can be updated in the time domain in one serving cell and for a UE 115 that is configured with more than one CSI process. However, it may not be applicable to all transmission modes.

Additionally or alternatively, if a UE 115 is configured with a physical uplink control channel secondary channel (PUCCH-SCell), and if the UE 115 receives multiple aperiodic CSI report requests in a subframe triggering more than one CSI report for both the primary PUCCH group and the secondary PUCCH group, then the UE 115 may not be required to update CSI for more than five (5) CSI processes from the CSI processes corresponding to all the triggered CSI reports. This updating process may be done under the assumption that the total number of serving cells in the primary and secondary PUCCH group is no more than five (5). If a UE 115 is configured with more than five (5) serving cells, and if the UE 115 receives aperiodic CSI report requests in a subframe triggering more than $N_y$ CSI reports, the UE 115 may not be required to update CSI for more than $N_y$ CSI processes from the CSI processes corresponding to all the triggered CSI reports. In some cases, the value of $N_y$ may be given by maxNumberUpdatedCSI-Proc-r13. This approach may set a limit on the number of CSI processes that can be updated in the frequency domain and across all CCs.

In some cases, the UE 115 may be configured for regular TTIs and for sTTIs. In such cases, the sTTI CSIs and regular CSIs may be associated with separate DCI formats (e.g., the DCI which triggers the reporting for the sTTI CSI processes may be different than the DCI which triggers the reporting for regular CSI processes). Accordingly, the UE 115 may define separate $N_x$ and $N_y$ for both TTI and sTTI operations (e.g., according to DCI format). Additionally, the UE 115 may update CSI processes associated with sTTI CSI report requests according to $N_y$ and $N_u$, where $N_u$ may be defined as a number of unreported CSI processes (e.g., the number of unreported CSI processes before an sTTI in which signaling carrying the CSI reports corresponding to the CSI processes is transmitted). In some cases, $N_y$ may be a UE capability of the UE 115 and may be declared for CSI reporting under the sTTI operation.

In some cases, the UE 115 may be configured to support multiple types of communications with different priority levels (e.g., URLLC, eMBB communications, sTTI communications, etc.). As such, the UE 115 may need to provide updated CSI processes for each of the different priority level types of communications separately because each type may have a separately configured transmission mode. The UE 115 may be able to separately (e.g., separate CSI update capability) or jointly (e.g., joint CSI update capability) update CSI processes for the different priority level types of communications. For example, the UE 115 may define $N_x$ and $N_y$ for each type of communication (e.g., $N_{x\_sTTI}$, $N_{x\_URLLC}$, $N_{y\_sTTI}$, $N_{y\_URLLC}$), where the CSI process updates may be run separately for each type of communication. Such examples may include a separate $N_u$ for each type of CSI process (e.g., an $N_{u\_sTTI}$ and an $N_{u\_URLLC}$). Alternatively, the UE 115 may utilize a jointly defined $N_x$ and $N_y$ for the types of communications (e.g., $N_x$ and $N_y$ include both sTTI and URLLC CSI processes). Such examples may include a single $N_u$ for all CSI process types. In either case, the UE 115 may use the methods described herein. For example, the calculations performed for one set of variables, ($N_x$, $N_y$, $N_u$), could also be extended to multiple sets of variables, such as ($N_{x\_sTTI}$, $N_{y\_sTTI}$, $N_{u\_sTTI}$) and ($N_{x\_URLLC}$, $N_{y\_URLLC}$, $N_{u\_URLLC}$). Further, the UE 115 may determine a number of CSI processes to update for each set of variables, where each set of variables may correspond to a different type of CSI process.

Wireless communications system 100 may employ a set of priority rules for a UE 115 for determining which CSI processes are updated for the different types of communications when the UE 115 utilizes a joint CSI update capability. For example, the UE 115 may update CSI processes in time according to the type of communication associated with the CSI report request (e.g., URLLC CSI processes are updated before sTTI or eMBB CSI processes), when the CSI report request is received (e.g., earlier CSI report requests are updated before later CSI report requests), whether the CSI report request is aperiodic or periodic (e.g., aperiodic CSI report requests are updated before periodic CSI report requests), a cell index and/or CSI process index (e.g., lower indices are updated before larger indices), UE implementation, or a combination thereof. Additionally, the UE 115 may employ a set of priority rules for updating CSI processes over the frequency-domain. For example, the UE 115 may update CSI processes in frequency according to UE implementation, the type of communication associated with the CSI report request, a cell index and/or CSI process index, or a combination thereof.

Figure 2:
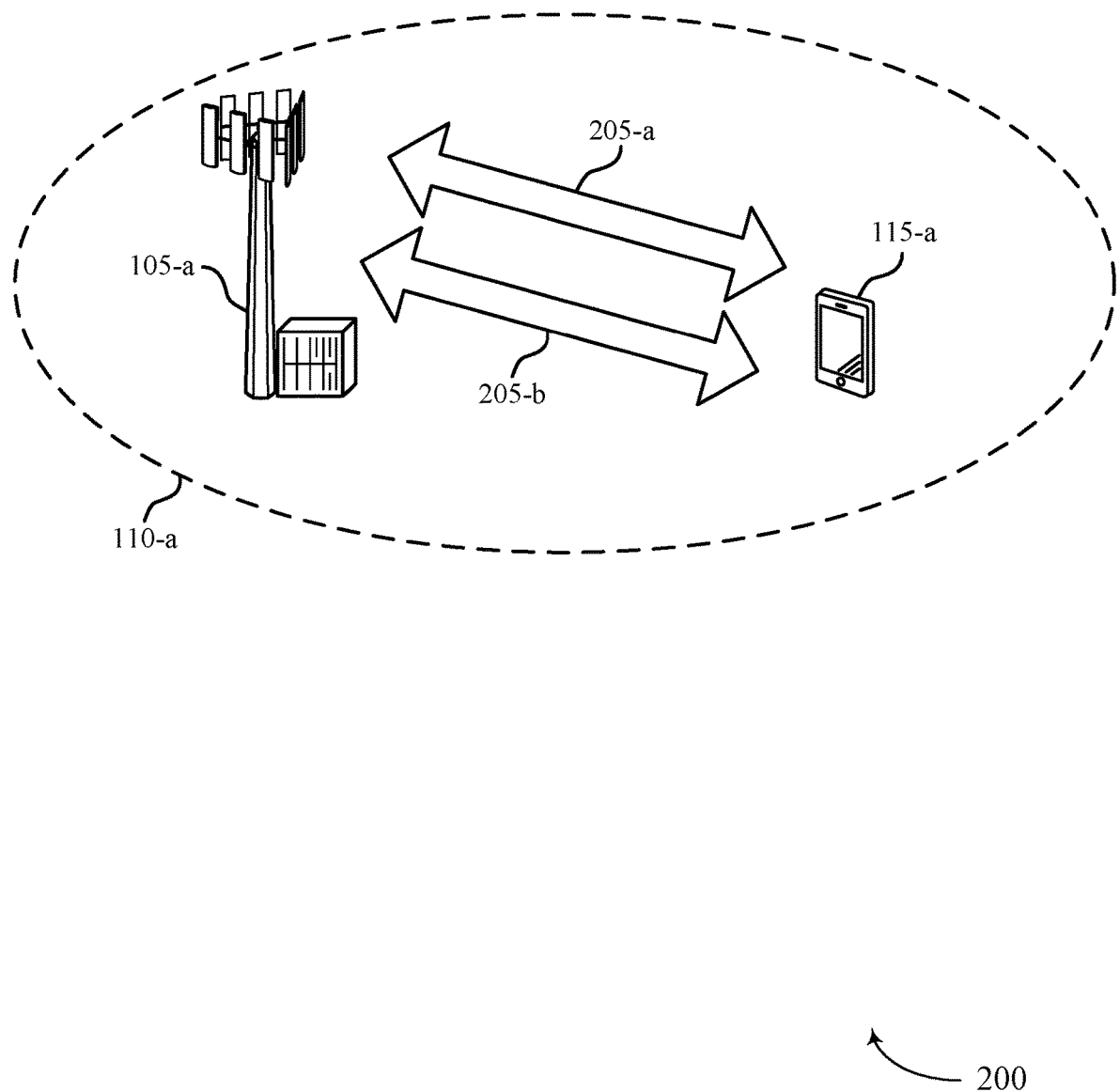
FIG. 2 illustrates an example of a wireless communications system that supports channel reporting for communication service priority types in accordance with aspects of the present disclosure.

FIG. 2 illustrates an example of a wireless communications system 200 that supports channel reporting for communication service priority types in accordance with various aspects of the present disclosure. In some examples, wireless communications system 200 may implement aspects of wireless communications system 100. Wireless communications system 200 may include a base station 105-a and a UE 115-a, which may be examples of corresponding base stations 105 and UEs 115 as described with reference to FIG. 1. Base station 105-a and UE 115-a may communicate on resources of a CC 205-a and a CC 205-b.

In some cases, UE 115-a may support multiple types of communications with different priority levels (URLLC, eMBB communications, sTTI communications, etc.) and a joint CSI update capability as described herein. For example, base station 105-a and UE 115-a may communicate on resources of CC 205-a utilizing a first priority level type of communication (e.g., URLLC) and on resources of CC 205-b utilizing a second priority level type of communication (e.g., sTTI communications or eMBB communications). Although not shown, it is to be understood that UE 115-a may communicate with multiple base stations on resources of one or more carriers (e.g., CCs 205). For example, UE 115-a may communicate with base station 105-a on resources of CC 205-a and with a neighboring base station 105 on resources of CC 205-b.

Each CC 205 may include multiple subcarriers. Base station 105-a may request CSI reports for one or more CCs 205. The request from base station 105-a may trigger CSI processes at UE 115-a, where UE 115-a may update corresponding CSI for CCs indicated by the requested CSI reports. To reduce the number of updates performed on CSI processes, UE 115-a may employ a set of priority rules to determine which CSI processes are updated. For example, UE 115-a may update CSI processes in time according to the type of communication associated with the CSI report request (e.g., URLLC CSI processes are updated before sTTI or eMBB CSI processes), then according to when the CSI report request is received (e.g., earlier CSI report requests are updated before later CSI report requests), then according to whether the CSI report request is aperiodic or periodic (e.g., aperiodic CSI report requests are updated before periodic CSI report requests), then according to a cell index and/or CSI process index (e.g., lower indices are updated before larger indices), and then according to UE implementation. Under these priority rules, the processing or updating of earlier triggered CSI processes may be stopped in favor of later triggered CSI processes. In cases of separate CSI update capability, UE 115-a may prioritize CSI processes of different service types separately, meaning that UE 115-a may prioritize the CSI processes under the latter three rules and/or other rules (e.g., the other rules disclosed herein). In some cases, higher priority may be given to URLLC CSI processes over sTII or eMBB CSI processes and then UE 115-a may prioritize CSI updating according to UE implementation. As an example, if a sTTI CSI process is received at an earlier time than a URLCC CSI process, the URLCC CSI may be prioritized because a CSI process being received earlier is less important under the priority rules than a CSI process being a URLCC CSI process. In general, prioritization may mean that CSI processes that are associated with a higher priority (e.g., by priority rules or elsewise) may be updated in favor of CSI processes that are associated with a lower priority. Even if a CSI process has a higher priority according to a few of the priority rules (e.g., an sTTI CSI process received at an earlier time than a URLLC process), some of the priority rules (e.g., the type of CSI process) may supersede the others (e.g., the time the CSI process was received).

Additionally, as described herein, UE 115-a may update $N_y$ CSI processes across all CCs 205 within a subframe. UE 115-a may similarly employ a set of priority rules for updating CSI processes over the frequency-domain. For example, UE 115-a may update CSI processes in frequency according to a priority level associated with URLLC CSI processes, eMBB CSI processes, sTTI CSI processes, or the like; then according to when the CSI report request is received; then according to whether the CSI report request is aperiodic or periodic; and then a cell index and/or CSI process index. In another example, higher priority may be given to URLLC CSI processes over sTII or eMBB CSI processes. In some cases, $N_y$ CSI processes may be prioritized according to UE implementation. Various combinations of priority levels for communication service priority type, time at which a CSI request was received, cell index, etc. may be considered without departing from the scope of the disclosure.

In some cases, UE 115-a may update CSI processes in time and/or frequency according to the format of the downlink control information (DCI) associated with each CSI report request. For example, the DCI format associated with a first set of CSI processes to be reported may be determined to be at a priority higher than a DCI format associated with a second set of CSI processes. As such, the first set of CSI processes may be prioritized over the second set of CSI processes. In some cases, updating the CSI processes based on the format of the DCI may be included in the set of priority rules and may be used in place of or in conjunction with the type of communication associated with the CSI report request or any of the other priority rules.

In some cases, UE 115-a may update CSI processes in time and/or frequency according to a trigger associated with a DCI associated with a set of CSI processes, such as a CSI request field. If the trigger has a value determined to have a priority higher than another trigger's value, the CSI processes associated with the DCI containing the higher priority trigger may be prioritized over CSI processes associated with the DCI containing the lower priority trigger value. In some cases, updating the CSI processes based on the trigger value may be included in the set of priority rules and may be used in place of or in conjunction with the type of communication associated with the CSI report request or any other priority rules.

In some cases, UE 115-a may update CSI processes in time and/or frequency according to the BLER target of requested CSI processes. For example, a first CSI process may have a BLER target of $10^{-5}$ and a second CSI process may have a BLER target of $10^{-1}$. In some cases, the CSI process with a BLER target of $10^{-1}$ may be prioritized over the CSI process with the BLER target of $10^{-5}$ (i.e., CSI processes with higher BLER target values may be targeted over those with lower BLER target values). In other cases, CSI processes with lower BLER target values may be prioritized over CSI processes with higher BLER target values. In some cases, updating the CSI processes based on the BLER target value may be included in the set of priority rules and may be used in place of or in conjunction with the type of communication associated with the CSI report request and/or any other priority rules.

In some cases, the capabilities may be separately indicated for each type of communication, but in pairs. For example, UE 115-a may indicate the following list of capabilities: (the number of CSI processes to update for sTTI, the number of CSI processes to update for URLLC)= (3,5) and (2,7). In some cases, the URLLC CSI computation may be less computationally intensive or otherwise easier than sTTI. For example, if sTTI CSI processes is reduced by one, UE 115-a may handle two (2) more URLLC CSI processes (e.g., decreasing the number of sTTI processes from three (3) to two (2) results in an increase in the number of URLLC CSI processes from five (5) to seven (7)). Each pair (X,Y) may signify that UE 115-a may not go beyond Y number of CSI processes for URLLC while UE 115-a processes X number of CSIs for sTTI. This scenario may be different from the case where the capability is a single value, and that single value could all be for sTTI or URLLC. Additionally, it may be different from the separate indication for each type of communication.

As an example, a first request may trigger CSI for five (5) sTTI CSI processes. UE 115-a, with the pairs above, may support three (3) of triggered five (5) sTTI CSI processes and drop the other two (2) sTTI CSI processes. A subsequent request may trigger ten (10) URLLC CSI processes. UE 115-a may keep the three (3) sTTI CSI processes and update up to five (5) URLLC CSI processes. Alternatively, UE 115-a may drop one (1) sTTI CSI process from initially supported three (3) sTTI CSI processes and then support up to seven (7) URLLC CSI processes (i.e., (2,7)). According to the priority rules defined above, UE 115-a may utilize the second approach (e.g., prioritize the URLLC CSI processes over the sTTI processes or prioritize the URLCC CSI processes over CSI processes associated with a lower priority DCI format, trigger, or BLER target value).

Figure 3A:
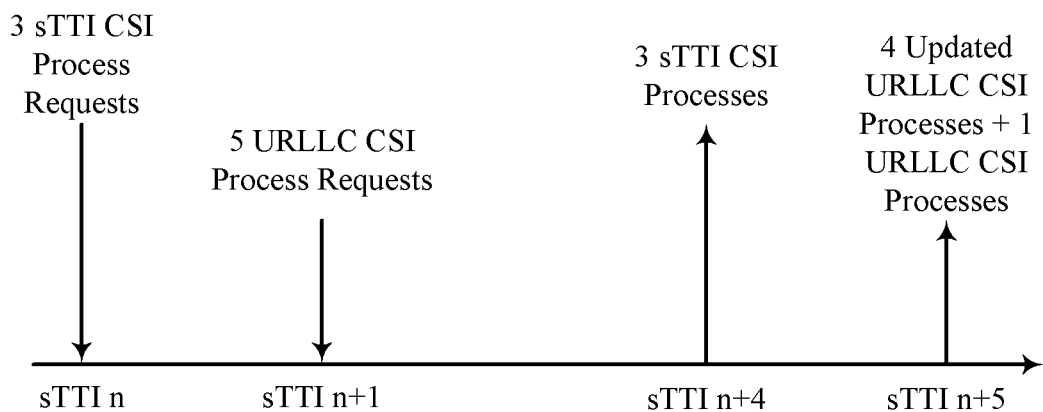
FIGS. 3A and 3B illustrate examples of channel state information (CSI) process timelines that support channel reporting for communication service priority types in accordance with aspects of the present disclosure.

FIG. 3A illustrates an example of a CSI process timeline 300 that supports channel reporting for communication service priority types in accordance with various aspects of the present disclosure. In some examples, CSI process timeline 300 may implement aspects of wireless communications systems 100 and 200. A base station 105 may request CSI reports associated with different types of communications at sTTI n and sTTI n+1 from a UE 115. As described herein, the UE 115 may employ a set of priority rules to determine which CSI processes to update before transmitting the CSI reports back to the base station 105 at sTTI n+4 and sTTI n+5. While sTTI CSI processes and URLCC processes follow the same timeline in the present example, it should be noted that the timelines may be different in some implementations.

In the example of CSI process timeline 300, the base station 105 may request three (3) sTTI CSI processes at sTTI n and five (5) URLLC CSI processes at sTTI n+1. The maximum number of CSI processes that the UE 115 may update across all CCs may be four (4) (i.e., $N_y=4$) and may be set jointly for both sTTI and URLLC operations (e.g., the UE 115 has a joint CSI update capability). The number of unreported CSI requests (Na) may be defined as described herein (i.e., all unreported CSI processes associated with other requests up until an sTTI before the sTTI where the CSI is reported on a shortened PUSCH (sPUSCH)). For example, the second set of CSI processes requested at sTTI n+1 should have corresponding CSI processes transmitted back to the base station 105 at sTTI n+5. Therefore, the number of unreported CSI requests may be counted until n+4. Since the unreported CSI processes are associated with other requests, the number of unreported CSI requests may be three (3) (i.e., $N_u=3$). Based on the priority rules described herein with reference to FIG. 2, the UE 115 may give a higher priority to the URLLC CSI process requests. Out of the five (5) URLLC CSI processes requested at n+1, the UE 115 may update four (4) of them (i.e., $N_y=4$). The UE 115 may update the four (4) URLCC CSI processes associated with the lowest indexed CSI processes/cell index.

As such, the sTTI CSI processes and the remaining URLLC CSI process may not be updated and may be transmitted based on information initially or previously received for the CC associated with each CSI process. Additionally, if the processing of the sTTI CSI processes had started, the UE 115 may stop or drop the processing in favor of the URLLC CSI processes. Accordingly, the UE 115 may transmit the three (3) sTTI CSI processes at sTTI n+4, where the UE 115 may have not updated the CSI processes. At sTTI n+5, the UE 115 may transmit the four (4) updated URLLC CSI processes and the one (1) URLLC CSI process that was not updated.

Figure 3B:
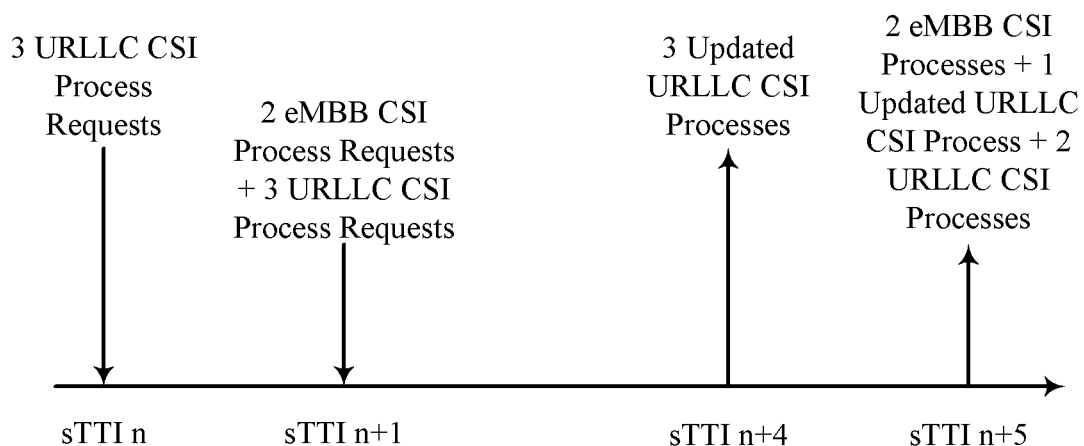

FIG. 3B illustrates an example of a CSI process timeline 301 that supports channel reporting for communication service priority types in accordance with various aspects of the present disclosure. In some examples, CSI process timeline 301 may implement aspects of wireless communications systems 100 and 200. A base station 105 may request CSI reports associated with different types of communications at sTTI n and sTTI n+1 from a UE 115. As described herein, the UE 115 may employ a set of priority rules to determine which CSI processes to update before transmitting the CSI reports back to the base station 105 at sTTI n+4 and sTTI n+5.

In the example of CSI process timeline 300, the base station 105 may request three (3) URLLC CSI processes at sTTI n and may further request two (2) eMBB CSI processes and three (3) URLLC CSI processes at sTTI n+1. The maximum number of CSI processes that the UE 115 may update across all CCs may be four (4) (i.e., $N_y=4$) and may be set jointly for both sTTI and URLLC operations (e.g., the UE 115 has a joint CSI update capability). The second set of CSI processes requested at sTTI n+1 should have corresponding CSI processes transmitted back to the base station 105 at sTTI n+5. Therefore, the number of unreported CSI requests may be counted until n+4. Since the unreported CSI processes are associated with other requests, the number of unreported CSI requests may be three (3) (i.e., $N_u=3$). Based on the priority rules described herein with reference to FIG. 2, the UE 115 may give a higher priority to the URLLC CSI process requests. Since there are six (6) total URLLC CSI processes to be updated and the maximum number of CSI processes that the UE 115 may update is four (4), the UE 115 may update four (4) of the six (6) URLLC CSI processes. Based on the priority rule described herein with reference to FIG. 2, for the same type of CSI process, the CSI processes triggered or requested earlier will take precedence. Therefore, the first three (3) URLLC processes requested at sTTI n may be updated, and out of the three (3) URLLC processes requested at sTTI n+1, the URLLC CSI process with the lowest-indexed CSI process may be updated.

A such, the eMBB CSI processes and the remaining URLLC CSI process that was not updated may be transmitted based on information initially or previously received for the CC associated with each CSI process. Accordingly, the UE 115 may transmit the three (3) updated URLLC CSI processes at sTTI n+4. At sTTI n+5, the UE 115 may transmit the one (1) updated URLLC CSI process, the remaining two (2) URLLC CSI processes that were not updated, and the two (2) eMBB CSI processes that were not updated.

Figure 4:
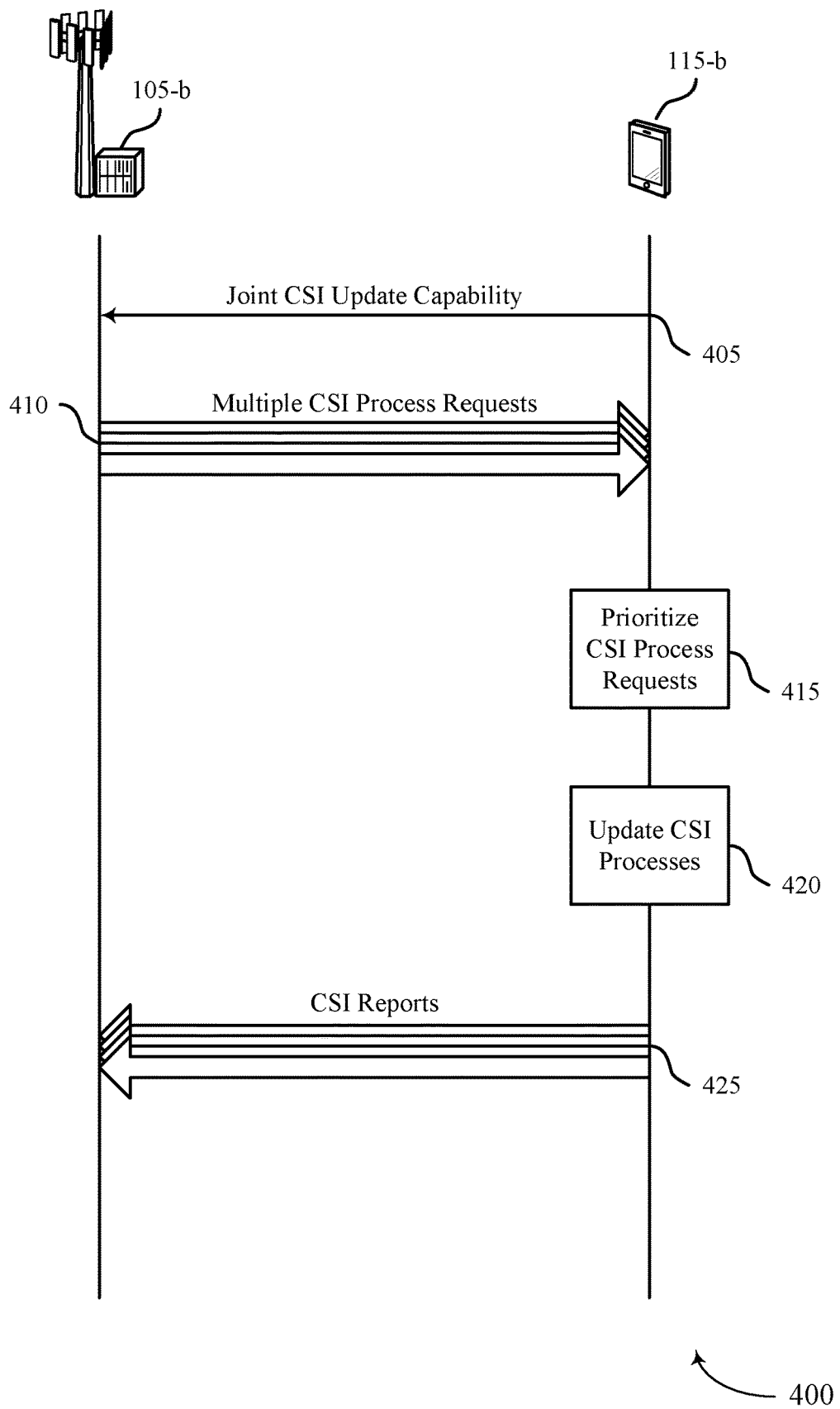
FIG. 4 illustrates an example of a process flow that supports channel reporting for communication service priority types in accordance with aspects of the present disclosure.

FIG. 4 illustrates an example of a process flow 400 that supports channel reporting for communication service priority types in accordance with various aspects of the present disclosure. In some examples, process flow 400 may implement aspects of wireless communications systems 100 and 200. Process flow 400 illustrates aspects of techniques performed by a base station 105-b and a UE 115-b, which may be examples of a base station 105 and a UE 115 as described with reference to FIGS. 1 through 3. In some cases, UE 115-b may support communications of a first service priority type (e.g., a first priority type of communications) and a second service priority type (e.g., a second priority type of communication). In some cases, the first service priority type may include an URLLC priority service, a sTTI priority service, or an eMBB priority service, and the second service priority type is different than the first service priority type.

In the following description of the process flow 400, the operations between UE 115-b and base station 105-b may be performed in different orders or at different times. Certain operations may also be left out of the process flow 400, or other operations may be added to the process flow 400. It is to be understood that while a UE 115 is shown performing a number of the operations of process flow 400, any transmitting device may perform the operations shown.

At 405, UE 115-b may report a joint CSI update capability associated with both the first and second service priority types. In some examples, a CSI update capability for UE 115-b may be separately reported for each type of communication in pairs, as described herein. For instance, UE 115-b may indicate the following list of capabilities: (the number of CSI processes to update for sTTI, the number of CSI processes to update for URLLC)=(3,5) and (2,7). In some cases, the URLLC CSI computation may be less computationally intensive or otherwise easier than sTTI. For example, if sTTI CSI processes is reduced by one, UE 115-b may handle up to two (2) more URLLC CSI processes (e.g., decreasing the number of sTTI processes from three (3) to two (2) results in an increase in the number of URLLC CSI processes from five (5) to seven (7)). In some cases, the joint CSI update capability may indicate a number of CSI update processes supported by UE 115-b per serving cell. Additionally or alternatively, the joint CSI update capability may indicate a number of CSI processes across multiple CCs capable of being updated by UE 115-b.

At 410, UE 115-b may receive multiple CSI process requests from base station 105-b. For example, UE 115-b may receive a first CSI request associated with the first service priority type, where a first CSI process of the one or more CSI processes is updated in response to the first CSI request; a second CSI request associated with the second service priority type, where a second CSI process of the one or more CSI processes is updated in response to the second CSI request; and a third CSI request associated with the first service priority type, where updating the CSI for the one or more CSI processes includes canceling a CSI update for the second CSI process and performing a CSI update for a third CSI process based on a set of priority rules and the joint CSI update capability.

At 415, UE 115-b may prioritize one or more CSI processes of the first service priority type or the second service priority type based on a set of priority rules and the joint CSI update capability. In some cases, UE 115-b may prioritize a CSI process associated with an URLLC priority service type over a CSI process associated with a sTTI priority service type in accordance with the set of priority rules. Additionally or alternatively, UE 115-b may prioritize a CSI process associated with an URLLC priority service type over a CSI process associated with an eMBB priority service type in accordance with the set of priority rules. In some cases, UE 115-b may further prioritize a CSI process associated with an earlier received CSI request over a CSI process associated with a later received CSI request in accordance with the set of priority rules. Additionally, UE 115-b may prioritize a CSI process associated with an aperiodic CSI request over a CSI process associated with a periodic CSI request in accordance with the set of priority rules. UE 115-b may further prioritize a CSI process associated with a lower cell index over a CSI process associated with a higher cell index in accordance with the set of priority rules. Additionally or alternatively, UE 115-b may prioritize a CSI process associated with a lower CSI process index over a CSI process associated with a higher CSI process index in accordance with the set of priority rules. Additionally or alternatively, UE 115-b may prioritize a CSI process associated with a first DCI format over a CSI process associated with a second DCI format different from the first DCI format in accordance with the set of priority rules. Additionally or alternatively, UE 115-b may prioritize a CSI process associated with a first BLER target value over a CSI process associated with a second BLER target value different from the first BLER target value in accordance with the set of priority rules.

At 420, UE 115-b may update CSI for the one or more CSI processes based on the prioritization of the one or more CSI processes. In some cases, UE 115-b may update fewer than all of the one or more CSI processes based on the prioritization of the one or more CSI processes and the joint CSI update capability. Additionally, UE 115-b may perform a CSI update for the first CSI process before performing a CSI update for the second CSI process based on the set of priority rules. In some examples, the one or more CSI processes may correspond to respective CCs of a primary cell or a secondary cell.

At 425, UE 115-b may report the updated CSI. In some cases, reporting the updating CSI may include transmitting a CSI feedback message via a PUSCH or a PUCCH. Additionally, reporting the updating CSI may include reporting respective CSI feedback messages for each of a plurality of CCs. In some cases, the updated CSI may be reported based on respective transmission modes associated with the one or more CSI processes. The reported CSI may include CSI that has been updated at 420, as well as CSI that has not been updated as a result of the prioritization decisions made at 415.

Figure 5:
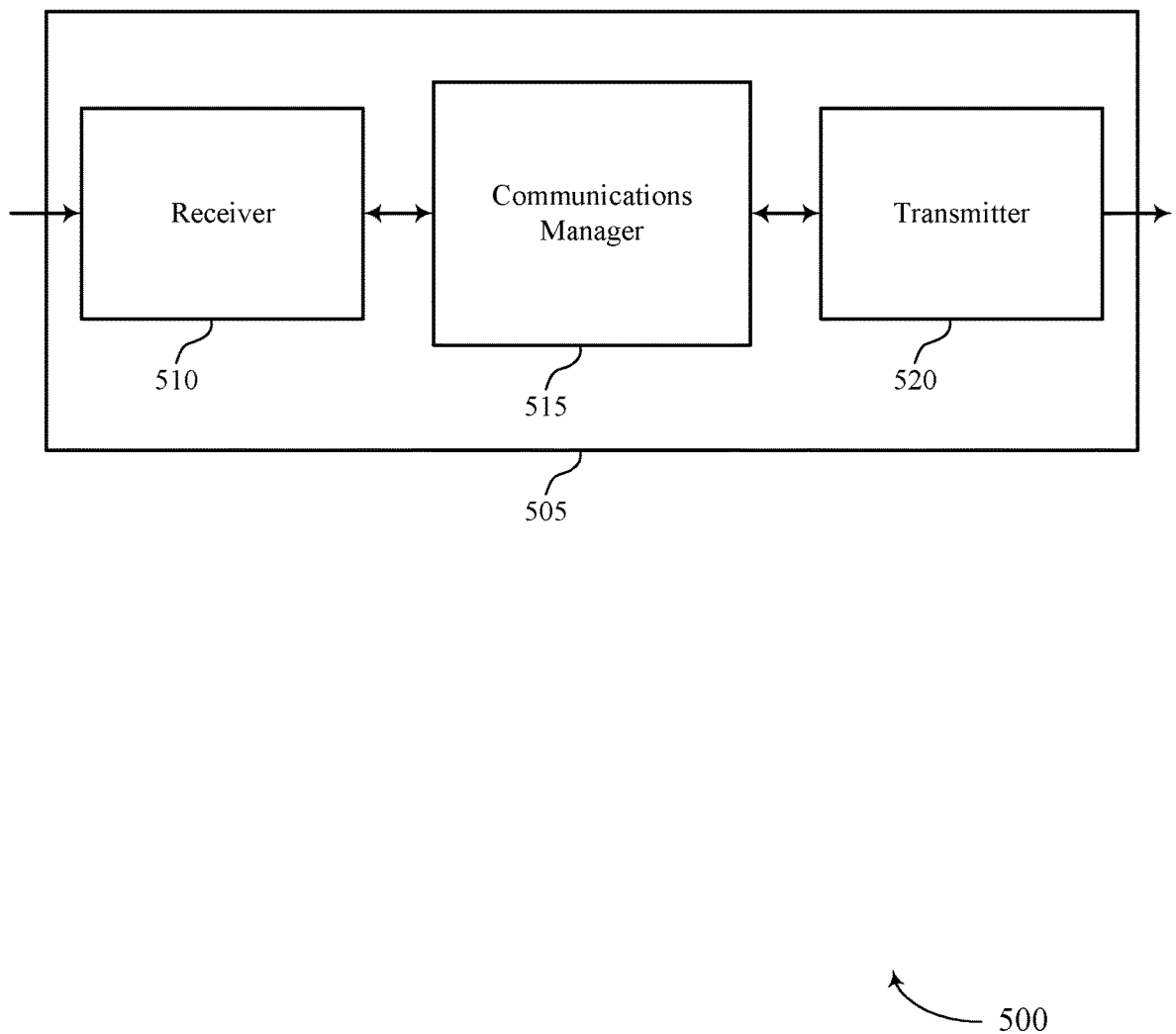
FIGS. 5 through 7 show block diagrams of a device that supports channel reporting for communication service priority types in accordance with aspects of the present disclosure.

FIG. 5 shows a block diagram 500 of a wireless device 505 that supports channel reporting for communication service priority types in accordance with aspects of the present disclosure. Wireless device 505 may be an example of aspects of a UE 115 as described herein. Wireless device 505 may include receiver 510, communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to channel reporting for communication service priority types, etc.). Information may be passed on to other components of the device. The receiver 510 may be an example of aspects of the transceiver 835 described with reference to FIG. 8. The receiver 510 may utilize a single antenna or a set of antennas.

Communications manager 515 may be an example of aspects of the communications manager 815 described with reference to FIG. 8. Communications manager 515 and/or at least some of its various sub-components may be implemented in hardware, software executed by a processor, firmware, or any combination thereof. If implemented in software executed by a processor, the functions of the communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 515 and/or at least some of its various sub-components may be physically located at various positions, including being distributed such that portions of functions are implemented at different physical locations by one or more physical devices. In some examples, communications manager 515 and/or at least some of its various sub-components may be a separate and distinct component in accordance with various aspects of the present disclosure. In other examples, communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 515 may identify that a UE 115 supports communications of a first service priority type and a second service priority type and may report a CSI update capability associated with both the first and second service priority types. Communications manager 515 may prioritize one or more CSI processes of the first service priority type, the second service priority type, or both based on a set of priority rules and the CSI update capability. Communications manager 515 may update CSI for the one or more CSI processes based on the prioritization of the one or more CSI processes and may report the updated CSI.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
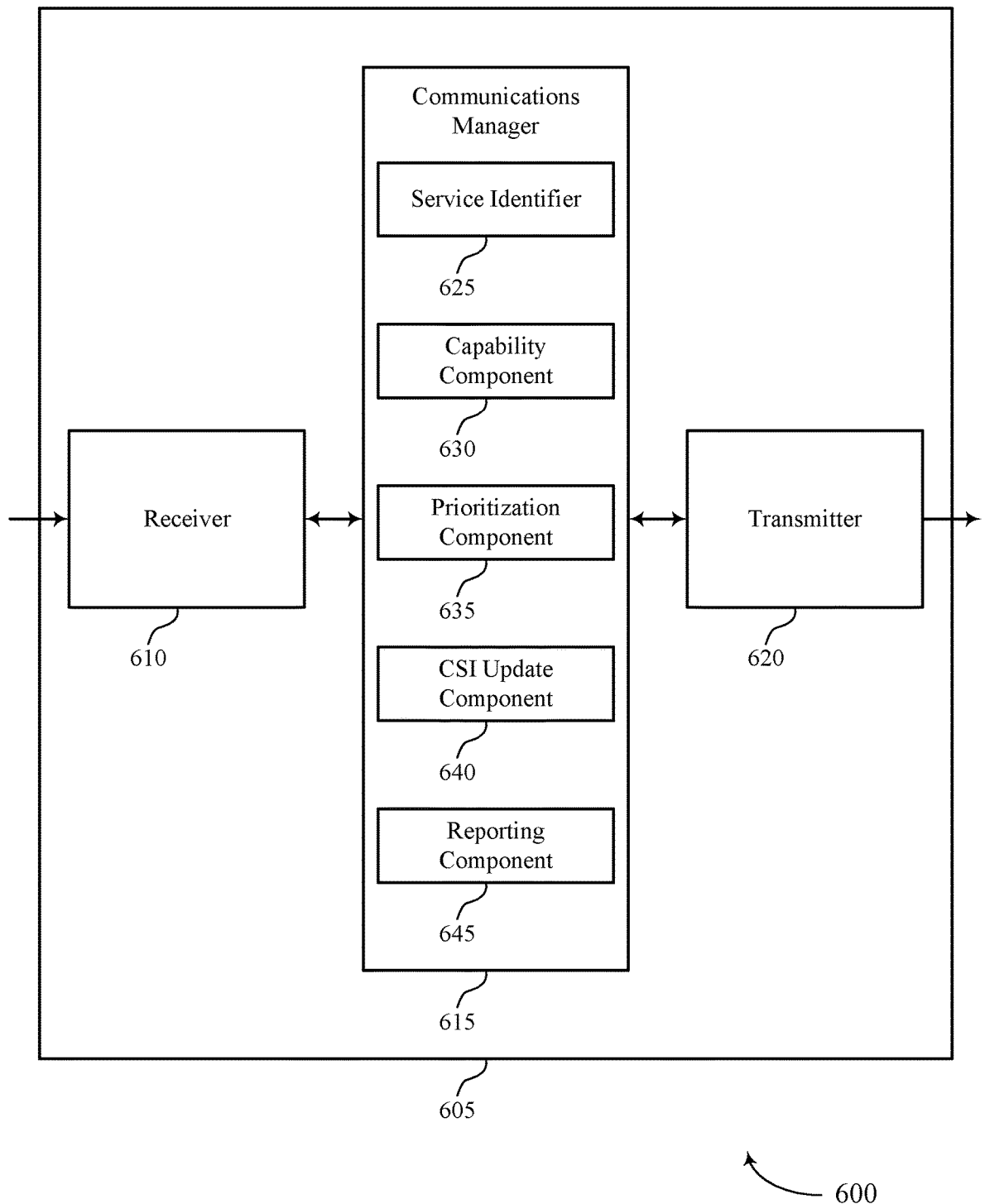

FIG. 6 shows a block diagram 600 of a wireless device 605 that supports channel reporting for communication service priority types in accordance with aspects of the present disclosure. Wireless device 605 may be an example of aspects of a wireless device 505 or a UE 115 as described with reference to FIG. 5. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to channel reporting for communication service priority types, etc.). Information may be passed on to other components of the device. The receiver 610 may be an example of aspects of the transceiver 835 described with reference to FIG. 8. The receiver 610 may utilize a single antenna or a set of antennas.

Communications manager 615 may be an example of aspects of the communications manager 815 described with reference to FIG. 8. Communications manager 615 may also include service identifier 625, capability component 630, prioritization component 635, CSI update component 640, and reporting component 645.

Service identifier 625 may identify that a UE 115 supports communications of a first service priority type and a second service priority type. In some cases, the first service priority type includes a URLLC priority service, an sTTI priority service, or an eMBB priority service and the second service priority type is different than the first service priority type.

Capability component 630 may report a CSI update capability associated with both the first and second service priority types. In some examples, reporting the CSI update capability includes reporting a pair of CSI update capabilities, each corresponding to a respective one of the first service priority type and the second service priority type. In some aspects, the CSI update capability indicates a number of CSI update processes supported by the UE 115 per serving cell. In some cases, the CSI update capability indicates a number of CSI processes across multiple CCs capable of being updated by the UE 115. In some examples of the method, apparatus, and non-transitory computer-readable medium described herein, the CSI update capability may be a joint CSI update capability.

Prioritization component 635 may prioritize one or more CSI processes of the first service priority type, the second service priority type, or both based on a set of priority rules and the CSI update capability. In some examples, prioritizing the one or more CSI processes includes: prioritizing a CSI process associated with a URLLC priority service type over a CSI process associated with an sTTI priority service type in accordance with the set of priority rules. In some aspects, prioritizing the one or more CSI processes includes: prioritizing a CSI process associated with a URLLC priority service type over a CSI process associated with an eMBB priority service type in accordance with the set of priority rules. In some instances, prioritizing the one or more CSI processes includes: prioritizing a CSI process associated with an earlier received CSI request over a CSI process associated with a later received CSI request in accordance with the set of priority rules.

In some cases, prioritizing the one or more CSI processes includes: prioritizing a CSI process associated with an aperiodic CSI request over a CSI process associated with a periodic CSI request in accordance with the set of priority rules. In some examples, prioritizing the one or more CSI processes includes: prioritizing a CSI process associated with a lower cell index over a CSI process associated with a higher cell index in accordance with the set of priority rules. In some instances, prioritizing the one or more CSI processes includes: prioritizing a CSI process associated with a lower CSI process index over a CSI process associated with a higher CSI process index in accordance with the set of priority rules. In some aspects, prioritizing the one or more CSI processes includes: prioritizing a CSI process associated with a first DCI format over a CSI process associated with a second DCI format different from the first DCI format in accordance with the set of priority rules. In some cases, prioritizing the one or more CSI processes includes: prioritizing a CSI process associated with a first BLER target value over a CSI process associated with a second BLER target value different from the first BLER target value in accordance with the set of priority rules.

CSI update component 640 may update CSI for the one or more CSI processes based on the prioritization of the one or more CSI processes. In some examples, updating CSI for the one or more CSI processes includes: updating fewer than all of the one or more CSI processes based on the prioritization of the one or more CSI processes and the CSI update capability. In some aspects, updating CSI for the one or more CSI processes includes: performing a CSI update for the first CSI process before performing a CSI update for the second CSI process based on the set of priority rules. In some cases, the updated CSI is reported based on respective transmission modes associated with the one or more CSI processes. In some instances, the one or more CSI processes correspond to respective CCs of a primary cell or a secondary cell.

Reporting component 645 may report the updated CSI. In some cases, reporting the updated CSI includes: reporting a previously determined CSI of at least one of the one or more CSI processes based on the CSI update capability. In some cases, reporting the updated CSI includes: transmitting a CSI feedback message via a PUSCH or a PUCCH. In some cases, reporting the updated CSI includes: reporting respective CSI feedback messages for each of a set of CCs.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
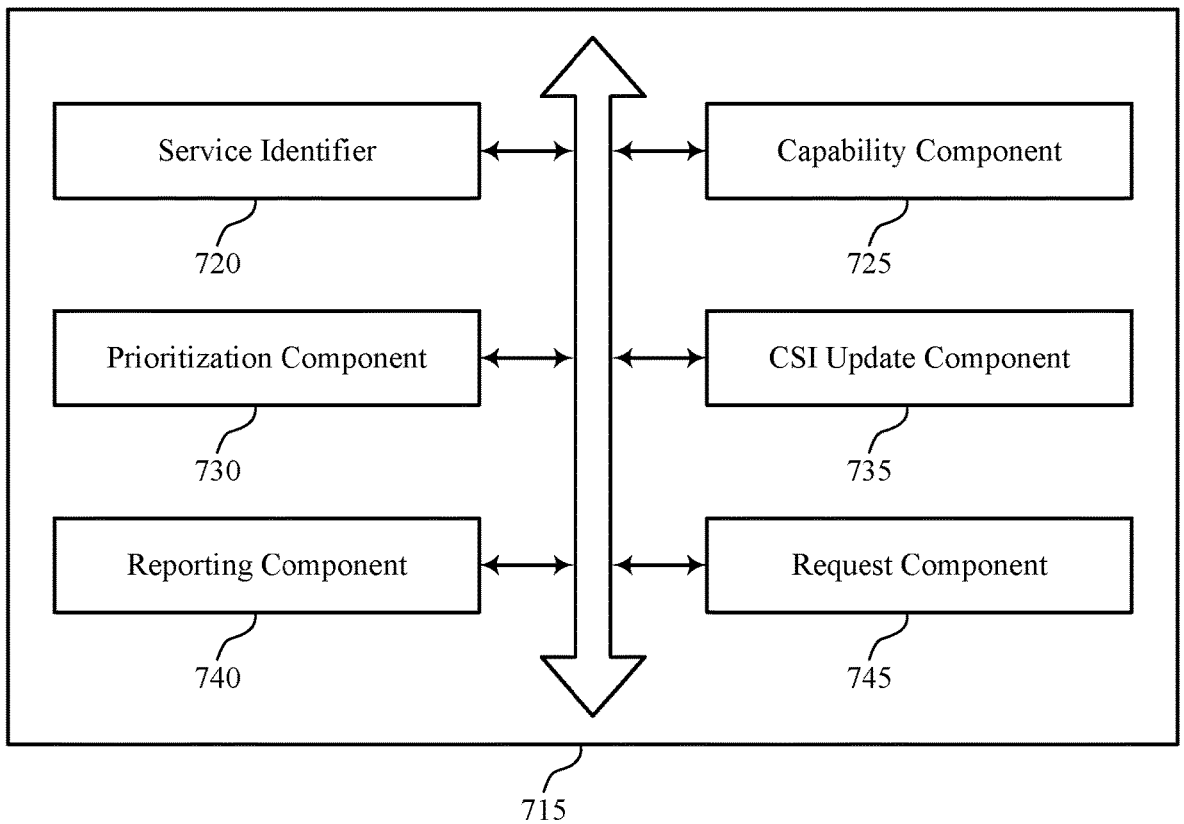

FIG. 7 shows a block diagram 700 of a communications manager 715 that supports channel reporting for communication service priority types in accordance with aspects of the present disclosure. The communications manager 715 may be an example of aspects of a communications manager 515, a communications manager 615, or a communications manager 815 described with reference to FIGS. 5, 6, and 8. The communications manager 715 may include service identifier 720, capability component 725, prioritization component 730, CSI update component 735, reporting component 740, and request component 745. Each of these modules may communicate, directly or indirectly, with one another (e.g., via one or more buses).

Service identifier 720 may identify that a UE 115 supports communications of a first service priority type and a second service priority type. In some cases, the first service priority type includes a URLLC priority service, an sTTI priority service, or an eMBB priority service and the second service priority type is different than the first service priority type.

Capability component 725 may report a CSI update capability associated with both the first and second service priority types. In some cases, reporting the CSI update capability includes reporting a pair of CSI update capabilities, each corresponding to a respective one of the first service priority type and the second service priority type. In some examples, the CSI update capability indicates a number of CSI update processes supported by the UE 115 per serving cell. In some instances, the CSI update capability indicates a number of CSI processes across multiple CCs capable of being updated by the UE 115.

Prioritization component 730 may prioritize one or more CSI processes of the first service priority type, the second service priority type, or both based on a set of priority rules and the CSI update capability. In some cases, prioritizing the one or more CSI processes includes: prioritizing a CSI process associated with a URLLC priority service type over a CSI process associated with an sTTI priority service type in accordance with the set of priority rules. In some examples, prioritizing the one or more CSI processes includes: prioritizing a CSI process associated with a URLLC priority service type over a CSI process associated with an eMBB priority service type in accordance with the set of priority rules. In some aspects, prioritizing the one or more CSI processes includes: prioritizing a CSI process associated with an earlier received CSI request over a CSI process associated with a later received CSI request in accordance with the set of priority rules. In some instances, prioritizing the one or more CSI processes includes: prioritizing a CSI process associated with an aperiodic CSI request over a CSI process associated with a periodic CSI request in accordance with the set of priority rules.

In some cases, prioritizing the one or more CSI processes includes: prioritizing a CSI process associated with a lower cell index over a CSI process associated with a higher cell index in accordance with the set of priority rules. In some examples, prioritizing the one or more CSI processes includes: prioritizing a CSI process associated with a lower CSI process index over a CSI process associated with a higher CSI process index in accordance with the set of priority rules. In some aspects, prioritizing the one or more CSI processes includes: prioritizing a CSI process associated with a first DCI format over a CSI process associated with a second DCI format different from the first DCI format in accordance with the set of priority rules. In some instances, prioritizing the one or more CSI processes includes: prioritizing a CSI process associated with a first BLER target value over a CSI process associated with a second BLER target value different from the first BLER target value in accordance with the set of priority rules. In some cases, prioritizing the one or more CSI processes includes: prioritizing a CSI process associated with a later received CSI request and a higher priority service type over a CSI process associated with an earlier received CSI request and a lower priority service type.

CSI update component 735 may update CSI for the one or more CSI processes based on the prioritization of the one or more CSI processes. In some cases, updating CSI for the one or more CSI processes includes: updating fewer than all of the one or more CSI processes based on the prioritization of the one or more CSI processes and the CSI update capability. In some examples, updating CSI for the one or more CSI processes includes: performing a CSI update for the first CSI process before performing a CSI update for the second CSI process based on the set of priority rules. In some aspects, the updated CSI is reported based on respective transmission modes associated with the one or more CSI processes. In some instances, the one or more CSI processes correspond to respective CCs of a primary cell or a secondary cell.

Reporting component 740 may report the updated CSI. In some cases, reporting the updated CSI includes: reporting a previously determined CSI of at least one of the one or more CSI processes based on the CSI update capability. In some examples, reporting the updated CSI includes: transmitting a CSI feedback message via a PUSCH or a PUCCH. In some instances, reporting the updated CSI includes: reporting respective CSI feedback messages for each of a set of CCs.

Request component 745 may receive a first CSI request associated with the first service priority type, where a first CSI process of the one or more CSI processes is updated in response to the first CSI request and receive a second CSI request associated with the second service priority type, where a second CSI process of the one or more CSI processes is updated in response to the second CSI request. Request component 745 may receive a third CSI request associated with the first service priority type, where updating the CSI for the one or more CSI processes includes canceling a CSI update for the second CSI process and performing a CSI update for a third CSI process based on the set of priority rules and the CSI update capability.

Figure 8:
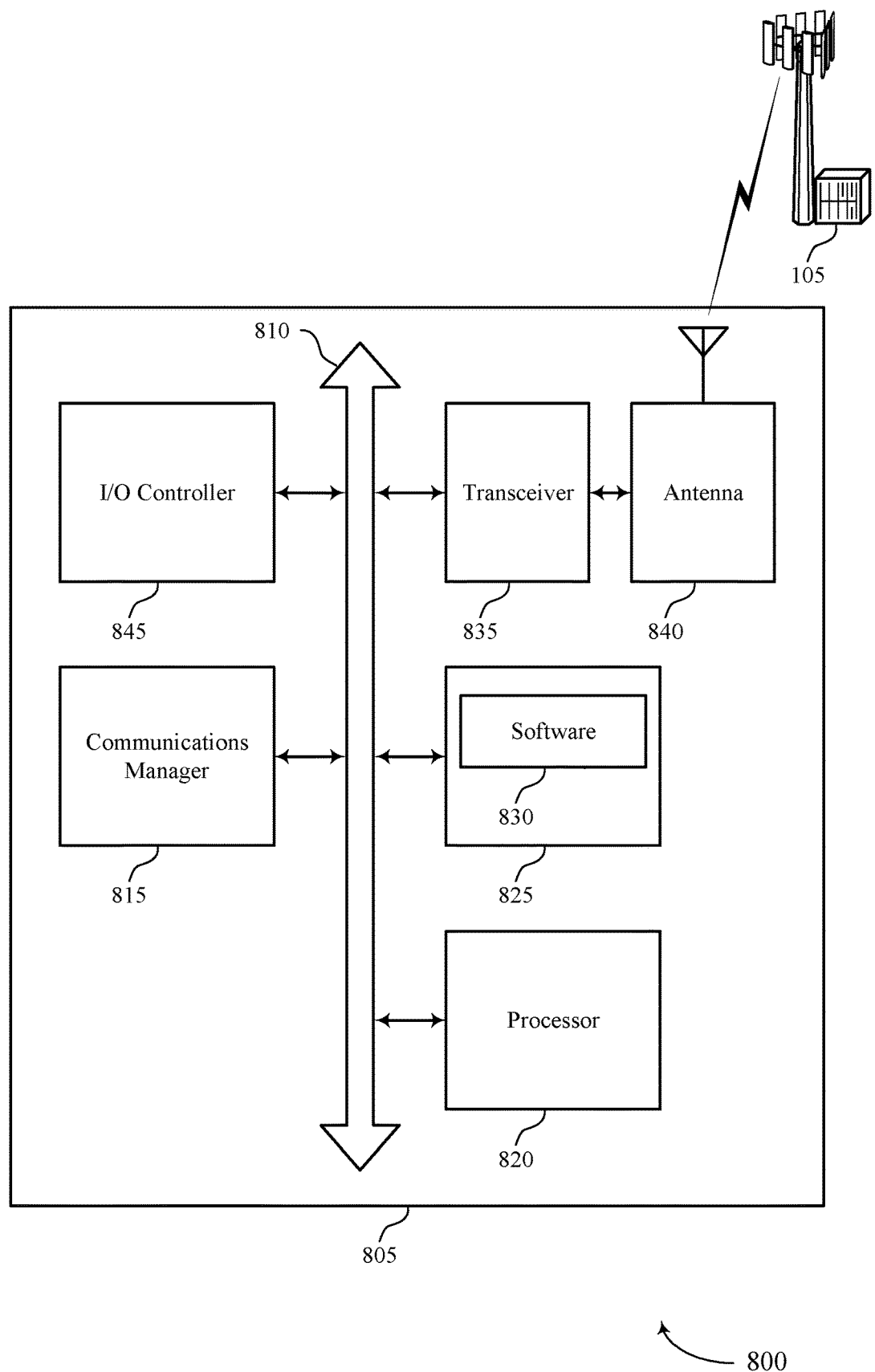
FIG. 8 illustrates a block diagram of a system including a user equipment (UE) that supports channel reporting for communication service priority types in accordance with aspects of the present disclosure.

FIG. 8 shows a diagram of a system 800 including a device 805 that supports channel reporting for communication service priority types in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting channel reporting for communication service priority types).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support channel reporting for communication service priority types. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

The wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
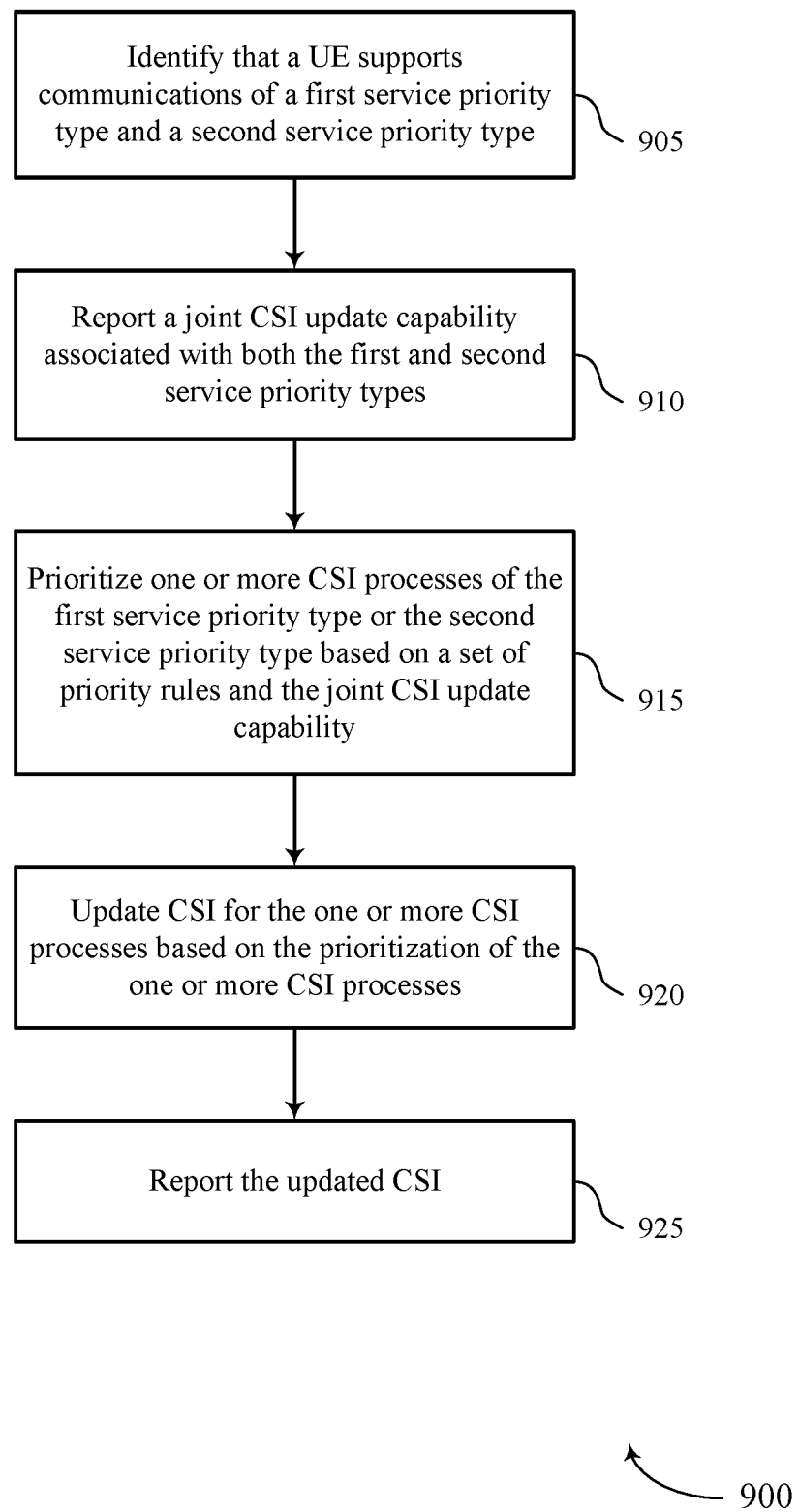
FIG. 9 illustrates a method for channel reporting for communication service priority types in accordance with aspects of the present disclosure.

FIG. 9 shows a flowchart illustrating a method 900 for channel reporting for communication service priority types in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 905 the UE 115 may identify that a UE 115 supports communications of a first service priority type and a second service priority type. The operations of 905 may be performed according to the methods described herein. In certain examples, aspects of the operations of 905 may be performed by a service identifier as described with reference to FIGS. 5 through 8.

At 910 the UE 115 may report a CSI update capability associated with both the first and second service priority types. The operations of 910 may be performed according to the methods described herein. In certain examples, aspects of the operations of 910 may be performed by a capability component as described with reference to FIGS. 5 through 8.

At 915 the UE 115 may prioritize one or more CSI processes of the first service priority type, the second service priority type, or both based at least in part on a set of priority rules and the CSI update capability. The operations of 915 may be performed according to the methods described herein. In certain examples, aspects of the operations of 915 may be performed by a prioritization component as described with reference to FIGS. 5 through 8.

At 920 the UE 115 may update CSI for the one or more CSI processes based at least in part on the prioritization of the one or more CSI processes. The operations of 920 may be performed according to the methods described herein. In certain examples, aspects of the operations of 920 may be performed by a CSI update component as described with reference to FIGS. 5 through 8.

At 925, the UE 115 may report the updated CSI. The operations of 925 may be performed according to the methods described herein. In certain examples, aspects of the operations of 925 may be performed by a reporting component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications systems 100 or 200, or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
    reporting a joint channel state information (CSI) update capability of a user equipment (UE) that supports communications of different service priority types, the joint CSI update capability indicating a total number of CSI processes capable of being performed by the UE for both a first service priority type and a second service priority type combined, wherein the first service priority type comprises an ultra-reliable low latency communications (URLLC) service priority type or a shortened transmission time interval (sTTI) service priority type and the second service priority type comprises the sTTI service priority type or an enhanced mobile broadband (eMBB) service priority type, and wherein the second service priority type is different than the first service priority type;
    receiving a first CSI request of the first service priority type after a second CSI request of the second service priority type;
    prioritizing, when a number of CSI processes of a first CSI process associated with the first CSI request combined with a number of CSI processes of a second CSI process associated with the second CSI request to update exceeds the total number, the first CSI process of the first service priority type over the second CSI process of the second service priority type in accordance with a set of priority rules associated with the first and second service priority types and based at least in part on the joint CSI update capability;
    updating CSI for the first CSI process of the first service priority type before updating CSI for the second CSI process of the second service priority type based at least in part on the prioritization of the first CSI process of the first service priority type over the second CSI process of the second service priority type and the first CSI request being received after the second CSI request; and
    reporting the updated CSI.

2. The method of claim 1, wherein reporting the updated CSI comprises:
    reporting the updated CSI and a previously determined CSI of the second CSI process based at least in part on the second service priority type.

3. The method of claim 1, wherein reporting the updated CSI comprises:
    refraining from reporting a previously determined CSI of the second CSI process based at least in part on the second service priority type.

4. The method of claim 1, wherein the first CSI process comprises a URLLC CSI process, and wherein the second CSI process comprises an sTTI CSI process.

5. The method of claim 1, wherein the first CSI process comprises a URLLC CSI process, and wherein the second CSI process comprises an eMBB CSI process.

6. The method of claim 1, wherein the first CSI request is associated with the first CSI process and is a first, aperiodic CSI request, the method further comprising:
    receiving a third, periodic CSI request of the first service priority type;
    prioritizing the first CSI process associated with the first, aperiodic CSI request over a third CSI process associated with the third, periodic CSI request in accordance with the set of priority rules.

7. The method of claim 1, further comprising:
    prioritizing the first CSI process associated with a lower cell index over a third CSI process of the first service priority type and associated with a higher cell index in accordance with the set of priority rules.

8. The method of claim 1, further comprising:
    prioritizing the first CSI process associated with a lower CSI process index over a third CSI process of the first service priority type and associated with a higher CSI process index in accordance with the set of priority rules.

9. The method of claim 1, further comprising:
prioritizing the first CSI process associated with a first downlink control information (DCI) format over a third CSI process of the first service priority type and associated with a second DCI format different from the first DCI format in accordance with the set of priority rules.

10. The method of claim 1, further comprising:
prioritizing the first CSI process associated with a first block error rate (BLER) target value over a third CSI process of the first service priority type and associated with a second BLER target value different from the first BLER target value in accordance with the set of priority rules.

11. The method of claim 1, wherein the first CSI process and the second CSI process are CSI processes of two or more CSI processes, and wherein updating CSI for the two or more CSI processes comprises:
updating fewer than all of the two or more CSI processes based at least in part on the prioritization of the two or more CSI processes and the joint CSI update capability.

12. The method of claim 1, wherein reporting the joint CSI update capability comprises:
reporting a pair of CSI update capabilities, each corresponding to a respective one of the first service priority type and the second service priority type.

13. The method of claim 1, wherein reporting the updated CSI comprises:
reporting a previously determined CSI of the second CSI process based at least in part on the joint CSI update capability.

14. The method of claim 1, wherein the first CSI process is updated in response to the first CSI request.

15. The method of claim 14, wherein the second CSI process is updated in response to the second CSI request.

16. The method of claim 15, wherein updating CSI comprises:
performing a CSI update for the first CSI process before performing a CSI update for the second CSI process based at least in part on the set of priority rules.

17. The method of claim 15, further comprising:
receiving a third CSI request associated with the first service priority type;
canceling a CSI update for the second CSI process; and
performing a CSI update for a third CSI process based at least in part on the set of priority rules and the joint CSI update capability.

18. The method of claim 1, wherein reporting the updated CSI comprises:
transmitting a CSI feedback message via a physical uplink shared channel (PUSCH) or a physical uplink control channel (PUCCH).

19. The method of claim 1, wherein reporting the updated CSI comprises:
reporting respective CSI feedback messages for each of a plurality of component carriers.

20. The method of claim 1, wherein the updated CSI is reported based at least in part on respective transmission modes associated with the first CSI process and the second CSI process.

21. The method of claim 1, wherein the joint CSI update capability indicates a number of CSI update processes supported by the UE per serving cell.

22. The method of claim 1, wherein the joint CSI update capability indicates a number of CSI processes across multiple component carriers capable of being updated by the UE.

23. The method of claim 1, wherein the first CSI process and the second CSI process correspond to respective component carriers of a primary cell or a secondary cell.

24. An apparatus for wireless communications, comprising:
a processor;
memory coupled with the processor; and
instructions stored in the memory and executable by the processor to cause the apparatus to:
report a joint channel state information (CSI) update capability of a user equipment (UE) that supports communications of different service priority types, the joint CSI update capability indicating a total number of CSI processes capable of being performed by the UE for both a first service priority type and a second service priority type combined, wherein the first service priority type comprises an ultra-reliable low latency communications (URLLC) service priority type or a shortened transmission time interval (sTTI) service priority type and the second service priority type comprises the sTTI service priority type or an enhanced mobile broadband (eMBB) service priority type, and wherein the second service priority type is different than the first service priority type;
receive a first CSI request of the first service priority type after a second CSI request of the second service priority type;
prioritize, when a number of CSI processes of a first CSI process associated with the first CSI request combined with a number of CSI processes of a second CSI process associated with the second CSI request to update exceeds the total number, the first CSI process of the first service priority type over the second CSI process of the second service priority type in accordance with a set of priority rules associated with the first and second service priority types and based at least in part on the joint CSI update capability;
update CSI for the first CSI process of the first service priority type before updating CSI for the second CSI process of the second service priority type based at least in part on the prioritization of the first CSI process of the first service priority type over the second CSI process of the second service priority type and the first CSI request being received after the second CSI request; and
report the updated CSI.

25. The apparatus of claim 24, wherein the instructions to report the updated CSI are executable by the processor to cause the apparatus to:
report the updated CSI and a previously determined CSI of the second CSI process based at least in part on the second service priority type.

26. The apparatus of claim 24, wherein the instructions to report the updated CSI are executable by the processor to cause the apparatus to:
refrain from reporting a previously determined CSI of the second CSI process based at least in part on the second service priority type.

27. The apparatus of claim 24, wherein the first CSI process comprises a URLLC CSI process, and wherein the second CSI process comprises an sTTI CSI process.

28. The apparatus of claim 24, wherein the first CSI process comprises a URLLC CSI process, and wherein the second CSI process comprises an eMBB CSI process.

29. The apparatus of claim 24, wherein the first CSI request is associated with the first CSI process and is a first, aperiodic CSI request, and wherein the instructions are further executable by the processor to cause the apparatus to:
receive a third, periodic CSI request of the first service priority type;
prioritize the first CSI process associated with the first, aperiodic CSI request over a third CSI process associated with the third, periodic CSI request in accordance with the set of priority rules.

30. The apparatus of claim 24, wherein the instructions are further executable by the processor to cause the apparatus to:
prioritize the first CSI process associated with a lower cell index over a third CSI process of the first service priority type and associated with a higher cell index in accordance with the set of priority rules.

31. The apparatus of claim 24, wherein the instructions are further executable by the processor to cause the apparatus to:
prioritize the first CSI process associated with a lower CSI process index over a third CSI process of the first service priority type and associated with a higher CSI process index in accordance with the set of priority rules.

32. The apparatus of claim 24, wherein the instructions are further executable by the processor to cause the apparatus to:
prioritize the first CSI process associated with a first downlink control information (DCI) format over a third CSI process of the first service priority type and associated with a second DCI format different from the first DCI format in accordance with the set of priority rules.

33. The apparatus of claim 24, wherein the instructions are further executable by the processor to cause the apparatus to:
prioritize the first CSI process associated with a first block error rate (BLER) target value over a third CSI process of the first service priority type associated with a second BLER target value different from the first BLER target value in accordance with the set of priority rules.

34. The apparatus of claim 24, wherein the first CSI process and the second CSI process are CSI processes of two or more CSI processes, and wherein the instructions to update CSI for the two or more CSI processes are executable by the processor to cause the apparatus to:
update fewer than all of the two or more CSI processes based at least in part on the prioritization of the two or more CSI processes and the joint CSI update capability.

35. The apparatus of claim 24, wherein the instructions to report the joint CSI update capability are executable by the processor to cause the apparatus to:
report a pair of CSI update capabilities, each corresponding to a respective one of the first service priority type and the second service priority type.

36. The apparatus of claim 24, wherein the instructions to report the updated CSI are executable by the processor to cause the apparatus to:
report a previously determined CSI of the second CSI process based at least in part on the joint CSI update capability.

37. The apparatus of claim 24, wherein:
the first CSI process is updated in response to the first CSI request.

38. The apparatus of claim 37, wherein:
the second CSI process is updated in response to the second CSI request.

39. The apparatus of claim 38, wherein the instructions to update CSI are executable by the processor to cause the apparatus to:
perform a CSI update for the first CSI process before performing a CSI update for the second CSI process based at least in part on the set of priority rules.

40. The apparatus of claim 38, wherein the instructions are further executable by the processor to cause the apparatus to:
receive a third CSI request associated with the first service priority type;
cancel a CSI update for the second CSI process; and
perform a CSI update for a third CSI process based at least in part on the set of priority rules and the joint CSI update capability.

41. The apparatus of claim 24, wherein the instructions to report the updated CSI are executable by the processor to cause the apparatus to:
transmit a CSI feedback message via a physical uplink shared channel (PUSCH) or a physical uplink control channel (PUCCH).

42. The apparatus of claim 24, wherein the instructions to report the updated CSI are executable by the processor to cause the apparatus to:
report respective CSI feedback messages for each of a plurality of component carriers.

43. The apparatus of claim 24, wherein the updated CSI is reported based at least in part on respective transmission modes associated with the first CSI process and the second CSI process.

44. The apparatus of claim 24, wherein the joint CSI update capability indicates a number of CSI update processes supported by the UE per serving cell.

45. The apparatus of claim 24, wherein the joint CSI update capability indicates a number of CSI processes across multiple component carriers capable of being updated by the UE.

46. The apparatus of claim 24, wherein the first CSI process and the second CSI process correspond to respective component carriers of a primary cell or a secondary cell.

47. An apparatus for wireless communications, comprising:
means for reporting a joint channel state information (CSI) update capability of a user equipment (UE) that supports communications of different service priority types, the joint CSI update capability indicating a total number of CSI processes capable of being performed by the UE for both a first service priority type and a second service priority type combined, wherein the first service priority type comprises an ultra-reliable low latency communications (URLLC) service priority type or a shortened transmission time interval (sTTI) service priority type and the second service priority type comprises the sTTI service priority type or an enhanced mobile broadband (eMBB) service priority type, and wherein the second service priority type is different than the first service priority type;
means for receiving a first CSI request of the first service priority type after a second CSI request of the second service priority type;
means for prioritizing, when a number of CSI processes of a first CSI process associated with the first CSI request combined with a number of CSI processes of a second CSI process associated with the second CSI request to update exceeds the total number, the first CSI process of the first service priority type over the second CSI process of the second service priority type in accordance with a set of priority rules associated with the first and second service priority types and based at least in part on the joint CSI update capability;

means for updating CSI for the first CSI process of the first service priority type before updating CSI for the second CSI process of the second service priority type based at least in part on the prioritization of the first CSI process of the first service priority type over the second CSI process of the second service priority type and the first CSI request being received after the second CSI request; and means for reporting the updated CSI.

48. A non-transitory computer-readable medium storing code for wireless communications, the code comprising instructions executable by a processor to:

report a joint channel state information (CSI) update capability of a user equipment (UE) that supports communications of different service priority types, the joint CSI update capability indicating a total number of CSI processes capable of being performed by the UE for both a first service priority type and a second service priority type combined, wherein the first service priority type comprises an ultra-reliable low latency communications (URLLC) service priority type or a shortened transmission time interval (sTTI) service priority type and the second service priority type comprises the sTTI service priority type or an enhanced mobile broadband (eMBB) service priority type, and wherein the second service priority type is different than the first service priority type;

receive a first CSI request of the first service priority type after a second CSI request of the second service priority type;

prioritize, when a number of CSI processes of a first CSI process associated with the first CSI request combined with a number of CSI processes of a second CSI process associated with the second CSI request to update exceeds the total number, the first CSI process of the first service priority type over the second CSI process of the second service priority type in accordance with a set of priority rules associated with the first and second service priority types and based at least in part on the joint CSI update capability;

update CSI for the first CSI process of the first service priority type before updating CSI for the second CSI process of the second service priority type based at least in part on the prioritization of the first CSI process of the first service priority type over the second CSI process of the second service priority type and the first CSI request being received after the second CSI request; and report the updated CSI.

* * * * *